(12) United States Patent
Tohyama et al.

(10) Patent No.: US 7,159,464 B2
(45) Date of Patent: Jan. 9, 2007

(54) PRESSURE SENSOR

(75) Inventors: Shuji Tohyama, Tokyo (JP); Hayato Kobayashi, Tokyo (JP); Ikuya Miyahara, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 36 days.

(21) Appl. No.: 11/091,248

(22) Filed: Mar. 28, 2005

(65) Prior Publication Data
US 2005/0217383 A1    Oct. 6, 2005

(30) Foreign Application Priority Data
Mar. 30, 2004    (JP)    ............................ 2004-100100

(51) Int. Cl.
*G01L 7/00*    (2006.01)
(52) U.S. Cl. ........................................ 73/706
(58) Field of Classification Search ................. 73/706, 73/727, 756, 715
See application file for complete search history.

(56) References Cited

U.S. PATENT DOCUMENTS

| | | |
|---|---|---|
| 6,422,085 B1 | 7/2002 | Hegner et al. |
| 2006/0081058 A1* | 4/2006 | Silverbrook et al. ....... 73/729.2 |
| 2006/0081061 A1* | 4/2006 | Silverbrook et al. .......... 73/754 |
| 2006/0081062 A1* | 4/2006 | Silverbrook et al. .......... 73/754 |
| 2006/0090568 A1* | 5/2006 | Silverbrook et al. .......... 73/753 |

FOREIGN PATENT DOCUMENTS

| | | |
|---|---|---|
| DE | 42 44 460 C1 | 4/1994 |
| EP | 0 974 825 A2 | 1/2000 |
| JP | 11-148880 | 6/1999 |

OTHER PUBLICATIONS

WO 96/34264, Pressure Transmitter With High Pressure Isolator Mounting Assembly, Publication Date: Oct. 31, 1996.

* cited by examiner

*Primary Examiner*—Edward Lefkowitz
*Assistant Examiner*—Andre Allen
(74) *Attorney, Agent, or Firm*—Rankin, Hill, Porter & Clark LLP

(57) ABSTRACT

An electric wire insertion hole (41) arranged in a housing (4), an ventilation path of inside space (422) of which one end is opened to a pressure sensor internal space (7) and an intersection portion (421) communicating the both each other are provided. Since the electric wire insertion hole (41) and the intersection (421) intersect at right angles, water or dust entering into the electric wire insertion hole (41) does not enter a lot into the intersection (421). Therefore, water or dust hardly enters into the pressure sensor internal space (7). There is no need of a waterproof or a dustproof filter or the like to prevent water or dust, hence low cost manufacturing can be achieved.

11 Claims, 1 Drawing Sheet

PRESSURE SENSOR

BACKGROUND OF THE INVENTION

1. Field of the Invention

The present invention relates to a pressure sensor, and in particular, to a pressure sensor that detects pressure difference between pressure of fluid to be measured and the atmospheric pressure.

2. Description of Related Art

Conventionally, in order to measure a fluid pressure, there has been used a pressure sensor that has a pressure receiving surface for fluid to be measured and an atmospheric pressure receiving surface, and is provided with a pressure sensor element detecting pressure difference between pressure of fluid to be measured and the atmospheric pressure to convert the pressure difference into electrical signals and a main body case that contains the pressure sensor element therein.

There is known a pressure sensor element with structure using a diaphragm. That is, one side surface of the diaphragm constitutes the pressure receiving surface for fluid to be measured and the other side surface constitutes the atmospheric pressure receiving surface. The fluid to be measured is brought into contact with the pressure receiving surface for fluid to be measured, and the atmospheric pressure receiving surface is opened to an internal space of the main body case where the pressure is kept to be same as an atmospheric pressure. Having the construction as described above, the diaphragm is deformed by the pressure difference between the pressure of fluid to be measured and the atmospheric pressure. The deformation of the diaphragm is detected as change of capacitance, electrical resistance or the like generated by the deformation and the pressure difference is converted into electrical signals.

In such a pressure sensor as described above, it has been conventionally general that the main body case employs sealed structure to improve a waterproof and a dust-proof function so as to protect the pressure sensor element. Sealing the main body case, however, brings about pressure change of the internal space of the main body case due to temperature change or diaphragm deformation, then pressure applied to the atmospheric pressure receiving surface of the diaphragm becomes unequal to the atmospheric pressure resulting in a problem of measurement accuracy deterioration.

In order to solve the above problem, there is a method that the main body case is not arranged to have sealed structure, but a vent is provided to communicate the internal space of the main body case with the atmosphere. In this method, however, when a measurement environment is severe where the pressure sensor is used, water or dust or the like enters into the internal space of the main body case through the vent and directly adheres to the pressure sensor element. As a result, such a problem is generated that the operation of the pressure sensor element fails, measurement accuracy deteriorates or measurement becomes impractical.

In order to solve above problems, there is known a method to overlay the vent communicating the internal space of the main body case with the atmosphere by means of a filter having air permeability and a waterproof property (for instance, refer to Japanese Patent Laid-Open Publication No. 11-148880, FIG. 1 and others). Since the filter has the air permeability, the pressure of the internal space of the main body case is kept equal to the atmospheric pressure. Moreover, since the filter has the waterproof property, it is possible to prevent water from entering into the internal space of the main body case.

In this method, however, it is necessary to provide a filter to prevent water ingression into the internal space of the main body case, which generates problems of cost increase due to a filter material cost and a filter installation cost, as well as complication of the structure.

SUMMARY OF THE INVENTION

A main object of the present invention is to provide a pressure sensor with a simple structure that can prevent water or dust ingression into an internal space of a main body case and can be manufactured at a lower cost.

The pressure sensor according to the present invention includes a pressure sensor element having a pressure receiving surface for fluid to be measured and an atmospheric pressure receiving surface for detecting a pressure difference between the pressure of fluid to be measured and the atmospheric pressure and converting the pressure difference into electrical signals and a main body case containing the pressure sensor element therein, the main body case being provided with a vent therein to communicate an internal space of the main body with the atmosphere, the vent including one end opened to the internal space of the main body case and the other end opened to the atmosphere; in which the vent includes an intersection formed in a direction intersecting the direction of a line segment connecting the one end with the other end.

The pressure sensor according to the present invention detects a pressure difference between the pressure of fluid to be measured and the atmospheric pressure. The fluid to be measured is brought into contact with the pressure receiving surface for fluid to be measured of the pressure sensor element. On the other hand, the atmospheric pressure receiving surface of the pressure sensor element is opened to the internal space of the main body case. Due to the fact that a vent is provided, a pressure of the internal space of the main body case becomes equal to the atmospheric pressure, and thus, the atmospheric pressure receiving surface receives the atmospheric pressure.

According to the present invention, it is possible to reduce possibility that water or dust enters into the internal space of the main body case through the vent.

Since the other end of the vent is opened to the atmosphere, water or dust may enter into the vent from the other end. In the present invention, however, since the intersection is provided, such possibility is reduced that the water or dust entering from the other end reaches the one end portion of the vent and enters into the internal space of the main body case, compared to a construction that the vent is formed in a straight line from the one end to the other end.

According to the present invention, it is possible to reduce a possibility that water or dust enters into the internal space of the main body case by a simple construction without a waterproof filter or the like. Since the waterproof filter or the like is not used, it is possible to reduce a material cost and an installation cost thereof and to manufacture the pressure sensor at a lower cost.

Further, in the present invention, it is preferable that a foreign matter collecting portion is provided to accumulate foreign matter entering into the vent.

When foreign matter such as water or dust that has entered into the vent remains in the vent as they are, there is a risk that the vent may be blocked by the foreign matter. When the vent is blocked, the internal space of the main body case and the atmosphere can not communicate with each other and thus, a pressure of the internal space of the main body case becomes different from the atmospheric pressure. Then, the pressure received by the atmospheric pressure receiving surface of the pressure sensor element also becomes different from the atmospheric pressure, hence measurement accuracy deteriorates.

In the present invention, however, the foreign matter are accumulated in the foreign matter collecting portion, and thus, the foreign matter do not remain in the vent and may not block the vent. Therefore, according to the present invention, it is possible to prevent deterioration of the measurement accuracy caused by the vent blockage by the foreign matter.

It should be noted that as a foreign matter collecting portion, for instance, a space may be formed in the vicinity of the vent to contain foreign matter therein, or an absorbing member having a property of absorbing foreign matter may be attached to an inner wall surface of the vent.

Moreover, in the present invention, it is preferable that a plurality of the vents are formed.

According to the construction as described above, it is possible to reduce a possibility to generate failures of the pressure sensor caused by water or dust ingression into the internal space of the main body case, compared to a construction in which only one vent is formed.

In the pressure sensor of a construction in which only one vent is formed, communication between the internal space of the main body case and the atmosphere must be carried out through the one vent. Therefore, even in a state that the vent is nearly blocked by water or dust, the internal space of the main body case and the atmosphere must communicate with each other through the only one vent, and gas tends to flow forcedly through the vent so as to eliminate the pressure difference between the internal space of the main body case and the atmosphere. In particular, when the pressure of the internal space of the main body case becomes lower than the atmospheric pressure, gas tends to flow forcedly through the inside of the vent from the atmosphere side to the internal space of the main body case. Then, the water or dust nearly blocking the vent moves with flow of gas into the internal space of the main body case.

To the contrary, a plurality of the vents are formed in the pressure sensor of the present invention. In such arrangement, when any one of vents is nearly blocked by water or dust, communication between the internal space of the main body case and the atmosphere is performed through other vents. Gas will not flow forcedly through the inside of the one vent, consequently, such possibility is reduced that the water or dust nearly blocking the one vent enters into the internal space of the main body case with gas flow. Therefore, according to the present invention, it is possible to reduce the possibility to generate failures of the pressure sensor due to ingression of water or dust into the internal space of the main body case.

In addition, according to the present invention, compared to the arrangement in which only one vent is formed, communication between the internal space of the main body case and the atmosphere can be improved and the pressure of the internal space of the main body case can be kept equal to the atmospheric pressure more easily. Therefore, a pressure applied to the atmospheric pressure receiving surface of the pressure sensor element becomes consistently almost equal to the atmospheric pressure and the measurement accuracy of the pressure sensor can be improved.

Additionally, an attempt to communicate between the internal space of the main body case and the atmosphere sufficiently with only one vent requires a large diameter vent. When the diameter of the vent is large, water or dust enters easily and as a result the measurement accuracy deteriorates.

In the present invention, however, since a plurality of the vents are formed, the internal space of the main body case and the atmosphere can sufficiently communicate with each other even if a diameter of each vent is small. When the diameter of each vent is small, water or dust hardly enters therein, and therefore, it is possible to prevent deterioration of the measurement accuracy due to ingression of water or dust into the internal space of the main body case.

Moreover, in case any one of the vents is blocked by water or dust, communication between the internal space of the main body case and the atmosphere is carried on through other vents, thus a pressure of the internal space of the main body case is kept to be almost same as the atmospheric pressure. Then the pressure on the atmospheric pressure receiving surface of the pressure sensor element is also kept to be approximately same as the atmospheric pressure, and therefore, it is possible to maintain higher measurement accuracy.

Furthermore, in the present invention, it is preferable to have such arrangement that the main body case is provided with a connector; the other end portion of the vent is arranged to form an electric wire insertion hole where an electric wire having a counterpart connector to be connected to the connector is inserted; the one end portion of the vent is arranged to be a communication hole that includes one end opened to the internal space of the main body case and the other end opened to an internal space of the electric wire insertion hole to communicate the internal space of the main body case with the internal space of the electric wire insertion hole; an electrical signal transmit device is provided to transmit to the connector electrical signals converted by the pressure sensor element, in which the connector is connected to the counterpart connector to take out the electrical signals to the outside of the main body case through the electric wire.

In the present invention, the electrical signals converted in the pressure sensor element are transmitted to the connector by the electrical signal transmit device. The connector is connected to the counterpart connector that is provided to the electric wire inserted in the electric wire insertion hole to transmit the electrical signals to the counterpart connector and to the electric wire. The electric wire is, for instance, connected to a pressure indicator or a computer. In the pressure indicator or the like, arithmetic processing is performed to the electrical signals transmitted from the electric wire to calculate the pressure difference between the pressure of fluid to be measured and the atmospheric pressure. The pressure difference is properly displayed by the indicator, and thus, the pressure of fluid to be measured, exactly speaking the pressure difference between the pressure of fluid to be measured and the atmospheric pressure can be visually confirmed by the user. It should be noted that the present invention does not limit the applications of the electrical signals that are taken out to the outside of the main body case through the electric wire but the electrical signals can be used for various purposes, the electric wire being connected to various equipment.

In the present invention, the atmosphere and the internal space of the main body case can communicate with each other with the use of the electric wire insertion hole in which the electric wire is inserted to take out the electrical signals. It is not necessary to provide a vent only for the purpose to communicate the atmosphere with the internal space of the main body case, therefore, the pressure sensor having compact and less-waste construction can be realized. According to the construction as described above, it is possible to manufacture the pressure sensor at a lower cost.

In addition, in the present invention, it is preferable that the communication hole is formed at the other end to be in a direction intersecting a depth direction of the electric wire insertion hole.

When water or dust enters into the internal space of the main body case through the vent, firstly water or dust enters into the electric wire insertion hole as the other end portion of the vent. The moving direction of the water or dust is approximately the same as the depth direction of the electric wire insertion hole. Then, a part of the water or dust moves toward the other end of the communication hole that is opened to the internal space of the electric wire insertion hole.

In the present invention, by the way, the communication hole formed at the other end is directed in the direction intersecting the depth direction of the electric wire insertion hole. Thus, the water or dust moving along approximately the same direction as the depth direction of the electric wire insertion hole hardly enters into the inside of the communication hole from the other end of the communication hole. Then, a possibility that the water or dust enters into the internal space of the main body case through the communication hole is reduced, and therefore, it is possible to prevent deterioration of the measurement accuracy.

Further, in the present invention, it is preferable that the other end of the communication hole is formed on a sidewall surface of the electric wire insertion hole.

The water or dust that enters into the inside of the electric wire insertion hole moves in approximately the same direction as the depth direction of the electric wire insertion hole as described above. In other words, the water or dust moves toward a bottom surface of the electric wire insertion hole. If the other end of the communication hole is formed on the bottom surface of the electric wire insertion hole, a possibility that the water or dust moving toward the bottom surface enters into the inside of the communication hole from the other end of the communication hole may be increased, which therefore may deteriorate the measurement accuracy. In the present invention, however, since the other end of the communication hole is formed on the sidewall surface of the electric wire insertion hole, there is not such possibility and it is possible to prevent the deterioration of the measurement accuracy.

It should be noted that a foreign matter such as water or dust entering into the electric wire insertion hole is accumulated on the bottom surface of the electric wire insertion hole, which is the reason why a foreign matter collecting portion is formed.

Furthermore, according to the present invention, it is preferable that a plurality of the communication holes are formed.

In the present invention, when one of the communication holes is nearly blocked by water or dust, communication between the internal space of the main body case and the internal space of the electric wire insertion hole takes place through other communication holes. Resultantly, since gas will not flow forcedly through the inside of the one communication hole, the water or dust nearly blocking the one communication hole unlikely enters into the internal space of the main body case along the gas flow. Therefore, according to the present invention, it is possible to reduce a possibility of generating failures of the pressure sensor caused by ingression of water or dust into the internal space of the main body case.

Additionally, according to the present invention, compared to the construction in which only one communication hole is formed, communication between the internal space of the main body case and the internal space of the electric wire insertion hole can be improved, resultantly, communication between the internal space of the main body case and the atmosphere can be improved as well. Thus, it becomes easier to keep the pressure of the internal space of the main body case equal to the atmospheric pressure. Then, the pressure applied to the atmospheric pressure receiving surface of the pressure sensor element becomes almost equal to the atmospheric pressure, and therefore, it is possible to improve the measurement accuracy of the pressure sensor.

An attempt to communicate sufficiently between the internal space of the main body case and the internal space of the electric wire insertion hole with only one communication hole requires a large diameter communication hole. When the diameter of the communication hole is large, water or dust enters more easily and as a result, the measurement accuracy deteriorates.

In the present invention, however, since a plurality of the communication holes are formed, the internal space of the main body case and the internal space of the electric wire insertion hole can sufficiently communicate with each other even if a diameter of each communication hole is small. When the diameter of each communication hole is small, water or dust hardly enters therein, and thus, it is possible to prevent deterioration of the measurement accuracy caused by ingression of water or dust into the internal space of the main body case.

In addition, in case any one of the communication holes is blocked by water or dust, the internal space of the main body case and the internal space of the electric wire insertion hole can communicate with each other through other communication holes, and thus, the pressure of the internal space of the main body case can be kept approximately to be same as the atmospheric pressure. Therefore, the pressure that the atmospheric pressure receiving surface of the pressure sensor element receives is also kept approximately the same as the atmospheric pressure, and therefore, it is possible to maintain the higher measurement accuracy.

DETAILED DESCRIPTION OF PREFERRED EMBODIMENT(S)

Figure 1:
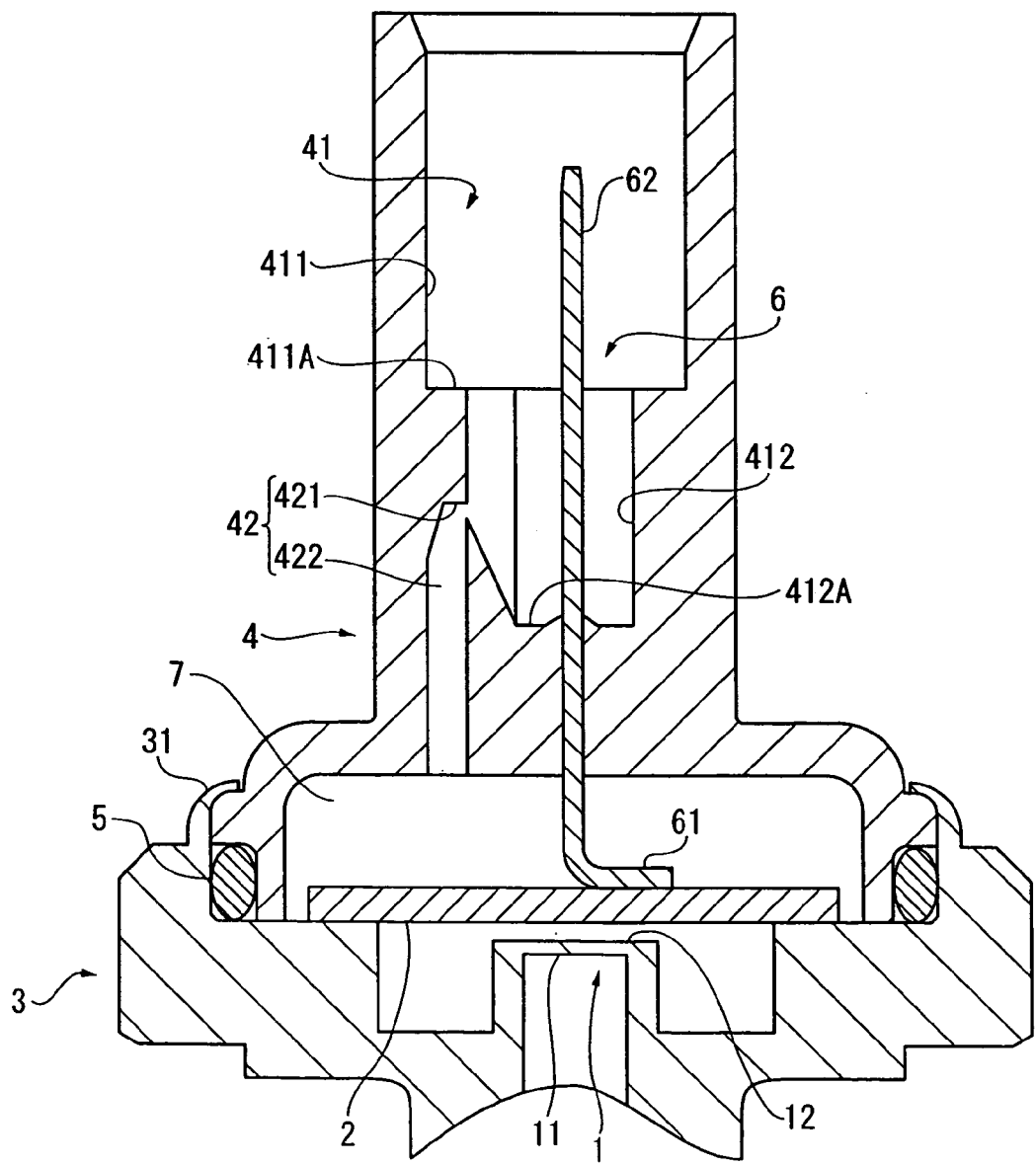
FIG. 1 is a cross-sectional view showing a pressure sensor related to an embodiment of the present invention.

An embodiment of the present invention will be described below with reference to the accompanying drawing.

FIG. 1 shows a pressure sensor of the embodiment.

The pressure sensor of the embodiment is provided with a diaphragm 1, an electronic circuit 2, a joint 3, a housing 4, an O-ring 5 and a male connector 6. The diaphragm 1 includes a pressure receiving surface for fluid to be measured 11 receiving the pressure of fluid to be measured and an atmospheric pressure receiving surface 12 receiving an atmospheric pressure and is elastically deformed by a pressure difference between the pressure of fluid to be measured and the atmospheric pressure. The electronic circuit 2 converts an elastic deformation of the diaphragm 1 into electrical signals. The joint 3 and the housing 4 contain the diaphragm 1 and the electronic circuit 2 therein. The O-ring 5 seals a space between the joint 3 and the housing 4. The male connector 6 includes one end 61 connected electrically to the electronic circuit 2 and the other end 62 protruded from a surface of the housing 4.

The diaphragm 1 may be a plate-shaped diaphragm or a wave-shaped diaphragm.

Various types of systems can be employed as systems to convert the elastic deformation of the diaphragm 1 into electrical signals in the electronic circuit 2, such as an electrical resistance type, a capacitance type, an electromagnetic induction type and a photoelectric type.

The pressure sensor is used by being attached via the joint 3 to a tube or the like through which the fluid to be measured flows or a container or the like in which the fluid to be measured is accumulated. In this attaching manner described above, the fluid to be measured is brought into contact with the pressure receiving surface for fluid to be measured 11 of the diaphragm 1.

It should be noted that the diaphragm 1 and the electronic circuit 2 constitute a pressure sensor element to detect pressure difference between the pressure of fluid to be measured and the atmospheric pressure and convert the pressure difference into electrical signals. The joint 3 and the housing 4 constitute a main body case therein containing the diaphragm 1 and the electronic circuit 2 as the pressure sensor element.

The joint 3 is joined to the housing 4 by a calking portion 31. A pressure sensor internal space 7 is formed between the joint 3 and the housing 4. The diaphragm 1 and the electronic circuit 2 are contained in the pressure sensor internal space 7.

The housing 4 is provided with an electric wire insertion hole 41 arranged on the upper side in FIG. 1 and a communication hole 42 one end of which is opened to the pressure sensor internal space 7 and the other end is formed on a sidewall surface of the electric wire insertion hole 41. A plurality of the communication holes 42 are formed (only one of them is shown in FIG. 1). The electric wire insertion hole 41 and the communication hole 42 constitute a vent having one end opened to the pressure sensor internal space 7 and the other end opened to the atmosphere.

The electric wire insertion hole 41 is a hole to insert an electric wire 8, which will be described hereinafter. The electric wire insertion hole 41 is composed of two parts each of which has a different diameter. The upper part of the electric wire insertion hole 41 in FIG. 1 is to be a large diameter part 411 that has a larger diameter and the lower part is to be a small diameter part 412 that has a smaller diameter. It should be noted that the other end of the communication hole 42 is formed on a sidewall surface of the small diameter part 412.

The communication hole 42 is directed to a horizontal direction at the other end (in FIG. 1) and establishes an intersection 421 that is formed in a intersecting direction (a horizontal direction) with reference to a line segment (an approximately vertical direction (in FIG. 1)) connecting the one end of the vent (the one end of the communication hole 42 (a lower end in FIG. 1)) and the other end of the vent (an upper end of the electric wire insertion hole 41 (in FIG. 1)). Moreover, a ventilation path of inside space 422 is formed continuously from the intersection 421 and is directed in a vertical direction (in FIG. 1). The communication hole 42 is a hole communicating the pressure sensor internal space 7 and an internal space of the electric wire insertion hole 41.

The male connector 6 transmits electrical signals converted in the electronic circuit 2 from the one end 61 side to the other end 62 side. By this reason, the male connector 6 itself constitutes an electrical signal transmitting device. The male connector 6 and the housing 4 are integrally produced by insert molding. There is no gap between the male connector 6 and the housing 4, therefore, a possibility that water, dust or the like enters therein is significantly reduced.

The electric wire 8 is inserted into the electric wire insertion hole 41. A diameter of the electric wire 8 is approximately equal to the diameter of the large diameter part 411, consequently there is little gap generated between the electric wire 8 and the large diameter part 411. The electric wire 8 is inserted to a bottom surface 411A of the large diameter part 411. A gap seal device such as a packing is provided to an outer peripheral surface of the electric wire 8 or an inner wall surface or the bottom surface of the large diameter part 411 so that no gap exists between the outer peripheral surface of the electric wire 8 and the large diameter part 411. Owing to this, it is possible to make such a possibility extremely lower that water, dust or air enters from gaps between the electric wire 8 and the large diameter part 411. The electric wire 8 includes a counterpart female connector 81 on an approximately central axis thereof. When the electric wire 8 is inserted into the large diameter part 411 of the electric wire insertion hole 41, the male connector 6 is inserted into the counterpart female connector 81 and both of the connectors are electrically connected. Thus, the electrical signals converted in the electronic circuit 2 are sequentially transmitted through the male connector 6 and the counterpart female connector 81. Then the electrical signals are taken out to the outside of the housing 4 by the electric wire 8 and transmitted to the other end of the electric wire 8. The other end of the electric wire 8 is connected to various equipment such as a pressure indicator and a computer to be used in various purposes. For instance, the pressure indicator performs arithmetic processing of the electrical signals and calculates the pressure difference between the pressure of fluid to be measured and an atmospheric pressure and properly displays the pressure difference on the indicator or the like. The pressure of fluid to be measured, or the pressure difference, to be exact, between the pressure of fluid to be measured and the atmospheric pressure can be recognized by the user.

An ventilation path inside electric wire (not shown) is formed in the electric wire 8 as a gap lasting along a longitudinal direction (a vertical direction in FIG. 1) so as to continue to the small diameter part 412 of the electric wire insertion hole 41 in a state that the electric wire 8 is inserted into the large diameter part 411 of the electric wire insertion hole 41. The ventilation path inside electric wire, for instance, may be a gap between a covering and a core wire of the electric wire 8 or a gap between a plurality of conducting wires constituting the core wire, or a longitudinal direction vent tube may be provided in the electric wire 8. Gas can pass through the gap, which means that the ventilation path is formed inside the electric wire 8. One end of the ventilation path inside electric wire is opened to an internal space of the small diameter part 412 and the other end (not shown) of the ventilation path inside electric wire is opened to the atmosphere in the other end portion of the electric wire 8 (not shown).

According to the construction as described above, the pressure sensor internal space 7 communicates with the atmosphere. The communication hole 42, one end of which is opened to the pressure sensor internal space 7, is opened to the small diameter part 412 of the electric wire insertion hole 41 at the other end. The small diameter part 412 communicates with the ventilation path inside electric wire, and further the other end of the ventilation path inside electric wire is opened to the atmosphere. Thus, the communication hole 42, the small diameter part 412 and the ventilation path inside electric wire form a ventilation path as a whole through which the pressure sensor internal space 7 and the atmosphere communicate with each other. Therefore, according to the arrangement described above, communication between the pressure sensor internal space 7 and the atmosphere can be established through the ventilation path inside of the electric wire formed in the electric wire 8, even if there is no gap between the wall surface or the bottom surface of the large diameter part 411 of the electric wire insertion hole 41 and the outer peripheral surface of the electric wire 8, and not only water or dust but also air can not enter between the both.

Thus, a pressure in the pressure sensor internal space 7 is kept approximately the same pressure as an atmospheric pressure, consequently the pressure receiving surface for fluid to be measured 11 of the diaphragm 1 receives approximately the same pressure as the atmospheric pressure, and it is possible to perform pressure measurement with reduced errors.

According to the pressure sensor of the embodiment, the following actions and advantages can be obtained.

(1) When foreign particles such as water or dust enter inside the small diameter part 412 of the electric wire insertion hole 41 through the ventilation path inside electric wire, the water or dust move along approximately the same direction as the depth direction of the small diameter part 412 (a vertical direction in FIG. 1). Since the intersection 421 of the communication hole 42 is formed in a direction perpendicular to the depth direction of the small diameter part 412 (a horizontal direction in FIG. 1), water or dust moving as described above hardly enters into the intersection 421. Therefore such a possibility that water or dust enters into the pressure sensor internal space 7 through the communication hole 42 (the intersection 421) is reduced. Consequently, there is less possibility that water or dust directly adheres to the diaphragm 1 and the electronic circuit 2, which are contained inside the pressure sensor internal space 7, and therefore, the pressure sensor failures due to adhesion of water or dust can be prevented and moreover deterioration of pressure measurement accuracy can be precluded.

(2) In addition, the water or dust that enters into the small diameter part 412 of the electric wire insertion hole 41 and move to the lower side (in FIG. 1) do not enter into the intersection 421 formed on the sidewall surface of the small diameter part 412 as described above but further move directly to the lower side to the bottom surface 412A of the small diameter part 412 and are accumulated thereon. Thus, the bottom surface 412A constitutes a foreign matter collecting portion that accumulates foreign matter such as water or dust entering into the small diameter part 412 as a part of the vent.

The water or dust are accumulated on the bottom surface 412A, and for instance, there is no chance that the other end portion of the communication hole 42 is blocked by water or dust. Therefore, the water or dust do not prevent communication of the pressure sensor internal space 7 with the atmosphere. Accordingly pressure of the pressure sensor internal space 7 can be maintained at approximately the same as an atmospheric pressure and to higher measurement accuracy can be retained.

(3) In the embodiment, the direction in which the intersection 421 is formed (the horizontal direction in FIG. 1) not only intersects (at right angles) the depth direction of the small diameter part 412 (the vertical direction in FIG. 1), but also intersects (at right angles) a direction of the ventilation path of inside space 422 (the vertical direction in FIG. 1). Therefore, the water or dust that has entered into the small diameter part 412 need to change moving direction thereof at least two times to enter into the pressure sensor internal space 7 through the intersection 421 and the ventilation path 422. Whenever moving direction is changed, the water or dust collide against the wall surface and decelerated. Thus, compared to a construction in which the vent (the electric wire insertion hole 41 and the communication hole 42 in the embodiment) is formed in a straight line from one end to the other, a possibility that the water or dust remain in the small diameter part 412, the intersection 421 or the ventilation path of inside space 422 is increased and the possibility that the water or dust enter into the pressure sensor internal space 7 is further reduced.

(4) Through adoption of the electric wire 8 having ventilation path inside electric wire formed therein, length of the ventilation path can be longer for communicating the pressure sensor internal space 7 with the atmosphere. Thus, even if water or dust enters from the other end (an end opened to the atmosphere) of the ventilation path inside electric wire, water or dust has less possibility to reach the pressure sensor internal space 7 through a long ventilation path travel, therefore it is possible to prevent deterioration of the measurement accuracy.

(5) A longer electric wire 8 enables to dispose the other end of the ventilation path inside electric wire of the electric wire 8 that is opened to the atmosphere in less water or dust environment, even though the pressure sensor is placed in such environment as with much water or dust hence one end portion of the electric wire 8 is placed in the same circumstance. Thus, water or dust hardly enters from the other end of the ventilation path inside electric wire, which can prevent deterioration of the measurement accuracy.

(6) A plurality of the communication holes 42 are formed in the embodiment. In such arrangement, when one of the communication holes 42 is nearly blocked by water or dust, communication between the pressure sensor internal space 7 and the small diameter part 412 of the electric wire insertion hole 41 is still conserved through other communication holes 42. Thus, gas will not flow forcedly through the communication hole 42 nearly blocked, and such possibility is reduced that choked water or dust nearly blocking the one of the communication holes 42 enters into the pressure sensor internal space 7 floating with gas flow. Therefore, according to the embodiment, it is possible to reduce such possibility that failures of the pressure sensor are generated by ingression of water or dust into the pressure sensor internal space 7.

(7) Further, a plurality of the communication holes 42, in comparison with such a construction that a single communication hole is formed, improves communication between the pressure sensor internal space 7 and the small diameter part 412 of the electric wire insertion hole 41, and accordingly the pressure sensor internal space 7 and the atmosphere can communicate with each other more smoothly. Thus, pressure in the pressure sensor internal space 7 can be kept equal to an atmospheric pressure more easily. As a result, pressure applied on the atmospheric pressure receiving surface 12 of the diaphragm 1 becomes consistently almost equal to the atmospheric pressure, hence it is possible to improve measurement accuracy of the pressure sensor.

(8) An attempt to communicate sufficiently with only one communication hole between the pressure sensor internal space 7 and the small diameter part 412 requires a large diameter communication hole. The larger diameter of the communication hole, the easier ingression of water or dust, resultantly the measurement accuracy deteriorates.

In the embodiment, however, since a plurality of the communication holes 42 are formed, communication between the pressure sensor internal space 7 and the small diameter part 412 can be established sufficiently even if a diameter of each communication hole 42 is small. When each diameter of the communication holes 42 is small, water or dust hardly enters therein, which therefore can prevent deterioration of the measurement accuracy due to ingression of water or dust into the pressure sensor internal space 7.

(9) Furthermore, in case that any one of the communication holes 42 is blocked by water or dust, communication between the pressure sensor internal space 7 and the small diameter part 412 can be conserved through other communication holes 42, and thus a pressure of the pressure sensor internal space 7 is kept approximately to be the same pressure as an atmospheric pressure. Consequently, the pressure applied on the atmospheric pressure receiving surface 12 of the diaphragm 1 is also kept approximately to be the same pressure as the atmospheric pressure, hence it is possible to maintain the higher measurement accuracy.

(10) According to the pressure sensor of the embodiment, it is possible to reduce a possibility that water or dust enters into the pressure sensor internal space 7 by a simple construction without the waterproof filter or the like. Since the waterproof filter or the like is not used, it is possible to reduce a material cost and an installation cost thereof and therefore to manufacture the pressure sensor at a lower cost.

It should be noted that the present invention is not limited to the embodiment described above but includes various changes and modifications in the scope where an object of the present invention can be attained.

For instance, in the embodiment described above, the diaphragm 1 is used as the pressure sensor element, but in the present invention, it is possible to use bellows (bellow), a capsule (a vacuum chamber, a chamber), a tube or the like, each of which is provided with pressure receiving surface for fluid to be measured and the atmospheric pressure receiving surface.

Furthermore, in the embodiment described above, the intersection 421 is perpendicular to both of the small diameter part 412 of the electric wire insertion hole 41 and the ventilation path of inside space 422, but in the present invention the intersection 421 need not intersect with right angle but may intersect, for instance, at an angle of 45 or 60 degrees. Moreover, in the present invention, it is enough for the intersection 421 to intersect the small diameter part 412 and it is not necessary for the intersection 421 to intersect (to be perpendicular) to the ventilation path of inside space 422. In other words, the communication hole 42 may be a linear hole.

In addition, in the embodiment described above, the electric wire 8 is provided with the counterpart female connector 81 and the electric wire insertion hole 41 is provided with the other end 62 of the male connector 6 therein, but in the present invention, the electric wire 8 may be provided with the male connector and the electric wire insertion hole 41 may be provided with the female connector therein.

Additionally, in the embodiment described above, a vent to communicate the pressure sensor internal space 7 with the atmosphere is formed by use of the electric wire insertion hole 41, but in the present invention, it is not necessary to use the electric wire insertion hole 41 so as to form the vent. That is, a vent may be directly provided in the housing 4 for dedicated purpose of ventilation. It is preferable that a plurality of the vents are formed in this case.

Moreover, in the embodiment described above, the male connector 6 itself constitutes the electrical signal transmitting device, but in the present invention, the electrical signal transmitting device may be composed of a member other than the male connector 6. For instance, there may be provided a conducting wire or the like that connects the electronic circuit 2 and the male connector 6 electrically.

The priority application Number JP2004-100100 upon which this patent application is based is hereby incorporated by reference.

What is claimed is:

1. A pressure sensor comprising:
   a pressure sensor element having a pressure receiving surface for a fluid to be measured and an atmospheric pressure receiving surface for detecting a pressure difference between a pressure of the fluid to be measured and atmospheric pressure and converting the pressure difference into electrical signals;
   a main body case containing the pressure sensor element therein;
   the main body case being provided with a vent therein to communicate an internal space of the main body case with atmosphere, the vent including one end portion opened to the internal space of the main body case and an other end portion opened to atmosphere;
   wherein, the vent includes an intersection formed in a direction intersecting a direction of a line segment connecting the one end portion with the other end portion, and wherein:
   the main body case is provided with a first connector;
   the other end portion of the vent is provided by an electric wire insertion hole in which an electric wire having a second connector to be connected to the first connector is inserted;
   the one end portion of the vent includes a communication hole having a first end opened to the internal space of the main body case and a second end opened to an internal space of the electric wire insertion hole to establish communication between the internal space of the main body case and the internal space of the electric wire insertion hole;
   an electrical signal transmit device is provided to transmit electrical signals converted by the pressure sensor element to the first connector; and
   the electrical signals are taken outside of the main body case through the electric wire by a connection established between the first connector and the second connector.

2. The pressure sensor according to claim 1, wherein:
   a foreign matter collecting portion is provided to accumulate foreign matter that comes into the vent.

3. The pressure sensor according to claim 1, wherein:
   the vent is one of a plurality of vents that are formed in the main body case.

4. The pressure sensor according to claim 2, wherein:
   the vent is one of a plurality of vents that are formed in the main body case.

5. The pressure sensor according to claim 1, wherein:
   the second end of the communication hole is formed in a direction intersecting a depth direction of the electric wire insertion hole.

6. The pressure sensor according to claim 1, wherein:
the second end of the communication hole is formed on a sidewall surface of the electric wire insertion hole.

7. The pressure sensor according to claim 5, wherein:
the second end of the communication hole is formed on a sidewall surface of the electric wire insertion hole.

8. The pressure sensor according to claim 1, wherein:
the communication hole is one of a plurality of communication holes that are formed in the main body case.

9. The pressure sensor according to claim 5, wherein:
the communication hole is one of a plurality of communication holes that are formed in the main body case.

10. The pressure sensor according to claim 6, wherein:
the communication hole is one of a plurality of communication holes that are formed in the main body case.

11. The pressure sensor according to claim 7, wherein:
the communication hole is one of a plurality of communication holes that are formed in the main body case.

* * * * *